Nov. 16, 1965    J. W. JACOBS    3,217,362
APPARATUS FOR LINING A HOLLOW MEMBER
Filed Feb. 5, 1964
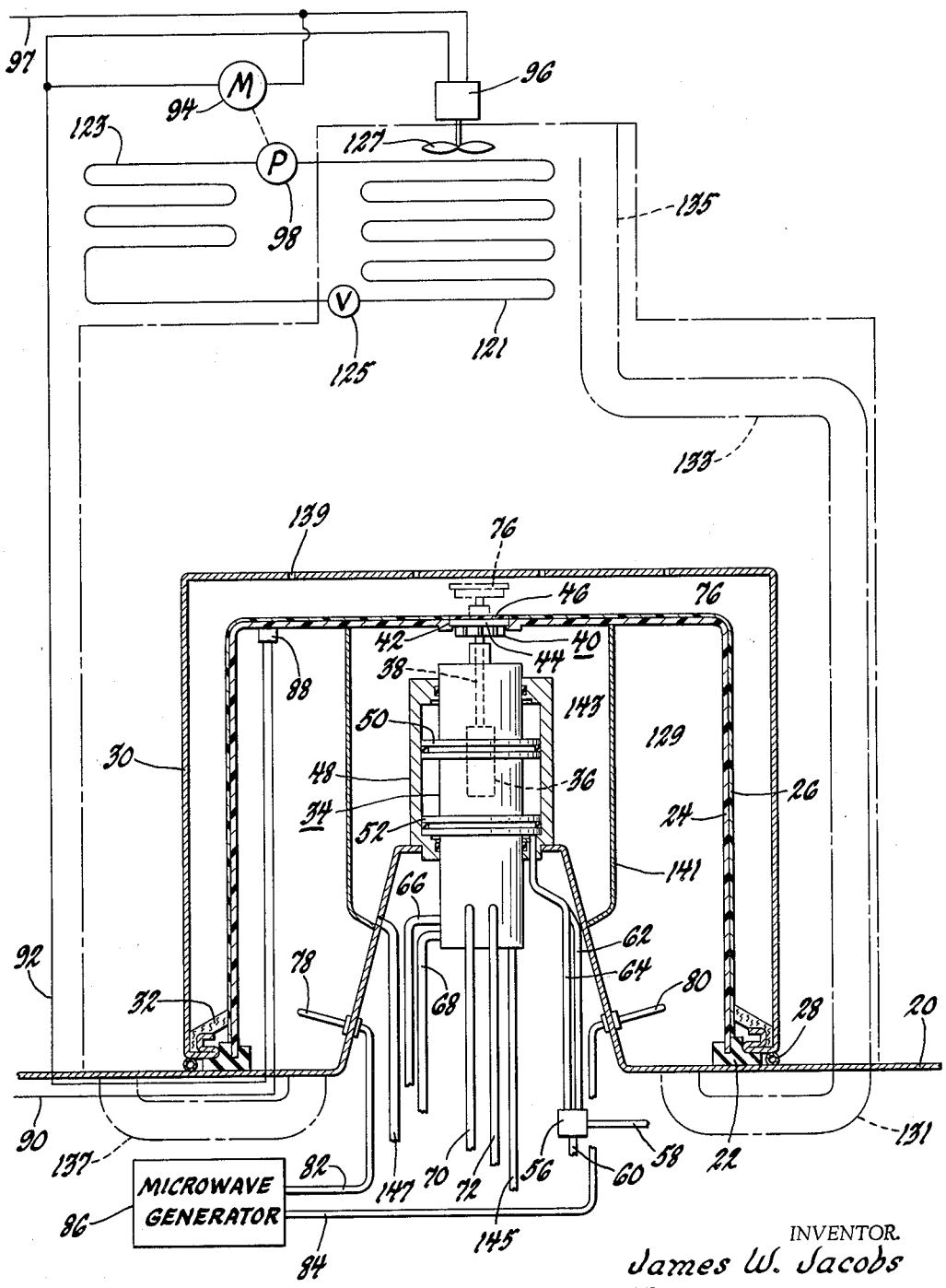
INVENTOR.
James W. Jacobs
BY
Carl A. Stickel
HIS ATTORNEY

United States Patent Office 3,217,362
Patented Nov. 16, 1965

3,217,362
APPARATUS FOR LINING A HOLLOW
MEMBER
James W. Jacobs, Dayton, Ohio, assignor to General Motors Corporation, Detroit, Mich., a corporation of Delaware
Filed Feb. 5, 1964, Ser. No. 342,750
11 Claims. (Cl. 18—26)

This invention pertains to apparatus for applying foam insulation to cabinet shells.

It has been found that the more recently developed foams such as polyurethane foams, charged with an insulating gas are lightweight, strong and efficient as insulation. However, considerable difficulty has been encountered in applying such foams to shells in mass production. The foam forming materials are highly reactive and somewhat corrosive and it is difficult to obtain a uniformity in cell structure and distribution. They likewise generate substantial pressures which often require heavy molds. Accurate control of the mixing as well as the amount of mixture is needed since the materials are expensive and excess material not only increases the cost, but may also make the product unsatisfactory. Manual pouring of the foams as well as manual controls may not be completely satisfactory since there is considerable danger of errors.

It is an object of this invention to provide an apparatus for more convenient, more uniform and more rapid application of foam-forming materials to a cabinet shell.

It is another object of this invention to provide an apparatus for more automatically applying foam-forming material to a cabinet shell.

It is another object of this invention to provide an apparatus for automatically introducing to and withdrawing a centrifuging flinger from the insulation space and flushing foam-forming material from the flinger.

These and other objects are attained in the form shown in the drawing in which a box-shaped inner mold covered by a release agent is provided over which the cabinet shell is placed with suitable seals at the throat. Within the mold there is provided a vertically movable foam mixer having an integral flinger above which is a movable wall section of the mold. The foam-forming components are fed to the mixer and the mixed components are fed to the rotating centrifugal flinger. As the mixer and flinger are moved upwardly, the movable wall section is lifted and the flinger, as it rotates centrifugally, distributes the foam-forming material within the space between the mold and the outer metal cabinet shell. The foaming of the foam-forming materials is accelerated by microwaves emitted from microwave radiators which are located within the mold. These microwave radiators are connected by coaxial cables to a microwave generator. A thermostatic control provided on the mold when it reaches a predetermined temperature starts a cooling system for circulating cool air around the shell and within the mold to cool the foam-forming material as it reacts exothermically to form the foam to minimize the pressures generated by the foam so that the need for heavy supporting molds is minimized. The mixer, flinger, and movable wall section are then lowered by a suitable air motor returning to its original position the movable mold section so that the foaming can be completed. The inner mold has a material permeable to microwaves which are confined by the metal walls of the cabinet and the metal support. The interior of the mold surrounding the mixer is provided with a flushing chamber by which the mixer and the flinger can be flushed when operation is stopped.

Further objects and advantages of the present invention will be apparent from the following description, reference being had to the accompanying drawings wherein a preferred embodiment of the present invention is clearly shown.

In the drawing:

The figure is a diagrammatic illustration of a method of and apparatus for automatically applying foam-forming materials to the inner wall structure of a refrigerator cabinet in accordance with my invention.

Referring now to the drawing, there is provided a metal supporting platform 20 upon which a flexible seal 22 preferably of flexible polyethylene supports an inverted box-shaped inner mold 24 of polymethylmethaclyrate. This mold 24 may have a slight taper such as 2° and is covered by a releasing agent 26 such as thin polyethylene sheet. Around the flexible seal 22 is a flexible microwave seal 28 of stranded wire or other suitable material. The metal cabinet shell 30 is placed over the mold 24 with its lower edges in engagement with the microwave seal 28. If desired, in addition there is provided a continuous strip 32 of glass fiber insulation between the bottom of the mold 24 and the lower edge of the cabinet shell 30 as viewed in the figure to prevent the escape of the foam-forming material at the throat of the cabinet shell 30.

Centrally located within the mold 24 is a foam mixer 34 containing a driving motor 36 operating a mixer therein and having a shaft extension 38 connecting with a rotary flinger 40 mounted on the upper end of the vertical shaft. This rotary flinger 40 in the lower most position of the mixer 34 is adapted to close the centrally located opening 42 in the wall of the mold 24. The flinger 40 is provided with an upper section 44 which serves as a movable wall section for the mold 24 to close the opening 42. The top surface of the upper section 44 of the flinger 40 is provided with a release agent such as a sheet 46 of polyethylene. The mixer 34 includes the mixing system embodied in Patent 3,092,469 issued June 4, 1963, or other suitable mixing systems.

The mixer 34 is slidably mounted in the air cylinder 48 and for this purpose is provided with upper and lower piston rings 50 and 52 which slide within the air cylinder 48. An air control valve 56 has air supply and exhaust connections 58 and 60 which are alternately connected through the upper and lower conduit connections 62 and 64 with the top and the bottom of the cylinder 48 so as to raise and lower the mixer 34 as well as the flinger 40. The mixer 34 is supplied with flexible supply and return conduits 66 and 68 for the "A" component and corresponding flexible supply and return conduits 70 and 72 for the "B" component.

The apparatus is capable of applying a considerable variety of materials to the interior of the cabinet shell 30. As one specific example, for the "A" component, a prepolymer made from 79 parts by weight of a polydiisocyanate mixture, comprising 80 parts by weight of 2,4 toluene diisocyanate and 20 parts by weight of 2,6 toluene diisocyanate together with 21 parts by weight of a polyether "A" as defined hereinafter are continuously circulated as a mixture through the supply conduit 66 to the mixer 34 and back through the return conduit 68. The "B" component circulates independently through the mixer 34 from the conduit 70 to the conduit 72. The "B" component is composed of 87 parts by weight of the same polyether "A" as defined hereinafter to 3 parts by weight of an activator consisting of 2 parts by weight of tetramethylbutanediamine and 1 part by weight of organosilicone surfactant and 38 parts by weight of trichloromonofluoromethane. The polyether "A" is made up of:

| | |
|---|---|
| Sucrose | 1. |
| Propylene oxide | 11. |
| Ethylene oxide | 4. |
| OH No. | 445–470 |
| $H_2O$ Max. (by wt.) | .15% |
| Viscosity (cps.) at 25° C. | 22000–32000 |
| Ph | 3.5–5 |

(All quantities expressed in mols unless otherwise noted.)

The "A" and "B" components through suitable dual simultaneous valve arrangements in the mixer 34 are separately introduced into the mixing chamber in the proportion of 100 parts by weight of the "A" or prepolymer component to 128 parts by weight of the "B" or polyether component. The valve 56 is operated so as to connect the supply air passage 58 with the lower connection 54 so as to apply air pressure beneath the piston ring 52 to lift the mixer 34, the flinger 40, its upper section and its polyethylene release face 46 to the dotted line position 74 with the flinger 40 being located in the space 76 between the mold 24 and the inner face of the cabinet shell 30. The mixer 34 delivers the mixed components from its mixing chamber to the flinger 40. While it is in the space 76 the flinger 40 is rotated coincidentally with the operation of the mixer 34 by the electric motor 36. When engaged by the mixed components, the rotating flinger 40 flings the components centrifugally to all the vertical portions of the space 76 between the mold 24 and the shell 30.

Extending through the metal support 20 are two or more microwave radiators 78 and 80 which are connected by the coaxial cables 82 and 84 to the microwave generator 86. As one specific example, the microwave generator may transmit microwaves to the radiators 78 and 80 at 2450 megacycles frequency and 685 watts available intensity. However other frequencies such as 915 megacycles and other intensities such as 1425 watts may be used if desired. In most instances, microwave energy within a frequency band of from 250 to 4500 megacycles per second is preferred since the lower frequencies have improved penetration abilities. Due to the specific function of the microwave energy, the use of catalysts may be reduced and in some cases completely eliminated if proper controls are provided. The uniform distribution of microwave energy from the radiators 78 and 80 uniformly heats the reaction mass of the "A" and "B" components in the space 76 so that the entire mass reacts simultaneously and uniformly. This makes possible more uniform temperatures during the recation so that substantially uniform cell size is obtained throughout and heavy crusts, red molding and other undesirable conditions are minimized. The completed foam is more uniformly distributed with a lower density so that less material is required and greater insulating efficiency is obtained.

Various polyesters, polyethers and polyesteramides, etc., may be used for the production of polyurethanes. Polyesters and polyesteramides may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, soribitol and/or alcohols such as ethanolamine and aminopropanol, etc. Alkylene glycols and polyoxalkylene glycols which may be used include ethylene glycol, propylene glycol, styrene glycol, diethylene glycol, polyethylene glycol, and polypropylene glycol and copolymers of these glycols, etc. Polyethers may be formed by reacting polypropylene oxide, or ethylene oxide, for example, with sorbitol, trimethylopropane, pentaerythritol, sucrose, methyl glucoside, phenol, etc.

Suitable organic polisocyanates for use in the reaction include aromatic diisocyanates such as toluene 2,4 diisocyanate, toluene 2,6 diisocyanate and mixtures thereof, ethylene diisocyanate, propylene -1,2- diisocyanate, butylene -1,3- diisocyanate, hexylene -1,6- diisocyanate, triphenylmethane diisocyanate, 1,5 polyphenol methane isocyanate.

Other foams which may also be used are cellular materials such as expoxy resins which may be blown by nitrogen releasing components, carbon dioxide or flurohydrocarbon. Epoxy foams as disclosed in the Wismer et al. Patent No. 3,051,665 wherein a fluorhydrocarbon is used as a blowing agent when reacted under the influence of the microwave energy as disclosed herein will consistently have lower density and more uniform cell structures. All these foams can be applied using the aforementioned method and apparatus.

For the purpose of minimizing expansion pressures and to eliminate or minimize the use of supporting molds for the cabinet shell 30, I provide within and attached to the inner face of the mold 24 a thermostatic control 88 which is responsive to the temperature of the foam-forming materials within the mold 24. This thermostatic control 88 is connected in series with the conductors 90 and 92 connecting with the compressor motor 94 and the fan motor 96. The compressor motor 94 and the fan motor 96 are also connected to the conductor 97. The compressor motor 94 drives the compressor 98 which withdraws evaporated refrigerant from the evaporator 121 and compresses and forwards the compressed refrigerant to a condenser 123 from which the liquefied refrigerant flows under the control of a suitable expansion device 125 such as a valve or restrictor to the evaporator 121. The fan 127 driven by the electric motor 96 draws air from the interior chamber 129 of the mold 24 through the ducts 131, 133 and 135, and discharges the air in heat transfer relation with the evaporator 121 to cool the air. The cooled air then circulates around the outer walls of the cabinet shell 30 and thence through the duct 137 into the space 129 within the mold 24 where it exerts a cooling effect on the walls of the mold. With this arrangement, the reaction mass, when it reaches a temperature such as 120° F., is cooled so as to prevent an undesirable rise in temperature and to maintain the temperature substantially constant. This minimizes expansion pressures and makes the foam more uniform in cell structure and light in weight. The cabinet shell 30 may be provided with preforation 139 in the rear or upper wall to allow the escape of displaced air and any exces foam-forming material.

When the proper amount of foam-forming material is discharged into the space 76, the valve 56 is operated to connect the air supply conduit 58 with the conduit 62 connected to the top of the cylinder 54 so as to lower the mixer 34 to the full line position in which the upper section 44 closes the opening 42 and the mold 24. Surrounding the mixer 34 is a metal wall 141 which encloses a flushing chamber 143. The mixer 34 may be supplied through a flexible conduit 145 with flushing liquid which will flush out the passages within the mixer extending to the flinger 40 and also will flush foaming material from the flinger 40. These are drained from the flushing chamber 143 through the drain tube 147.

While the embodiment of the present invention as herein disclosed, constitutes a preferred form, it is to be understood that other forms might be adopted.

What is claimed is as follows:

1. Apparatus for lining the interior of a hollow member including an inner mold adapted to be substantially surrounded by said hollow member, said mold having a flat wall portion provided with an opening, a movable wall section normally located in the plane of said wall portion and said opening and extending substantially completely over said opening for closing said opening, a supply apparatus for supplying material for lining a hollow member, a rotary flinger having one position within said mold, means for moving said movable wall section to open said opening and for moving said rotary flinger through said opening outside of said mold into the space between said mold and a hollow member surrounding the mold, means for supplying material to said rotary flinger and means for rotating said flinger to fling said material between said mold and said hollow member.

2. Apparatus as specified in claim 1 in which said movable wall section has its outer surface covered with a release agent.

3. Apparatus as specified in claim 1 in which said means for moving said movable wall section includes a connection between the removable wall section and the flinger for simultaneous movement uncovering the opening and moving said flinger through said opening.

4. Apparatus for lining the interior of a hollow member including an inner mold adapted to be substantially surrounded by said hollow member, said mold having a flat wall portion provided with an opening, a movable wall section normally located in the plane of said wall portion and said opening and extending substantially completely over said opening for closing said opening, a supply apparatus for supplying material for lining a hollow member, a rotary flinger having one position within said mold, means for moving said movable wall section to open said opening and for moving said rotary flinger through said opening outside of said mold into the space between said mold and a hollow member surrounding the mold, means for supplying material to said rotary flinger and means for rotating said flinger to fling said material between said mold and said hollow member, and means for returning said flinger to its position within said mold and for replacing said removable wall section into closing relationship with said opening.

5. Apparatus for lining the interior of a hollow member including an inner mold adapted to be substantially surrounded by said hollow member, said mold being provided with an opening, a movable wall section for closing said opening, a supply apparatus for supplying material for lining a hollow member, a rotary flinger, means for moving said movable wall section to open said opening and for moving said rotary flinger through said opening into the space between said mold and a hollow member surrounding the mold, means for supplying material to said rotary flinger and means for rotating said flinger to fling said material between said mold and said hollow member, and means responsive to the temperature of said mold for cooling said hollow member.

6. Apparatus for lining the interior of a hollow member including an inner mold adapted to be substantially surrounded by said hollow member, said mold being provided with an opening, a movable wall section for closing said opening, a foam mixer for supplying foam-forming material, a rotary flinger, means for moving said movable wall section to open said opening and for moving said rotary flinger through said opening into the space between said mold and a hollow member surrounding the mold, means for supplying foam-forming material from said mixer to said rotary flinger and means for rotating said flinger to fling said foam-forming material between said mold and said hollow member.

7. Apparatus for lining the interior of a hollow member including an inner mold adapted to be substantially surrounded by said hollow member, said mold being provided with an opening, a movable wall section for closing said opening, a foam mixer for supplying foam-forming material, a rotary flinger, means for moving said movable wall section to open said opening and for moving said rotary flinger through said opening into the space between said mold and a hollow member surrounding the mold, means for supplying foam-forming material from said mixer to said rotary flinger and means for rotating said flinger to fling said foam-forming material between said mold and said hollow member, and means responsive to the temperature of said mold for coling said hollow member.

8. Apparatus for lining the interior of a hollow member including an inner mold adapted to be substantially surrounded by said hollow member, said mold being provided with an opening, a movable wall section for closing said opening, a foam mixer provided with a rotary flinger aligned with said opening in said mold, said mixer being provided with means for mixing foam-forming materials to said flinger and rotating said flinger, means for moving said mixer to move said movable wall section to uncover said opening and to pass said flinger through said opening into the space between said mold and said hollow member to fling foam-forming material into said space.

9. Apparatus for lining the interior of a hollow member including an inner mold adapted to be substantially surrounded by said hollow member, said mold being provided with an opening, a movable wall section for closing said opening, a foam mixer provided with a rotary flinger aligned with said opening in said mold, said mixer being provided with means for mixing foam-forming materials to said flinger and rotating said flinger, means for moving said mixer to move said movable wall section to uncover said opening and to pass said flinger through said opening into the space between said mold and said hollow member to fling foam-forming material into said space, and means for withdrawing said flinger from said space and moving said movable wall section to cover said opening.

10. Apparatus for lining the interior of a hollow member including an inner mold adapted to be substantially surrounded by said hollow member, said mold being provided with an opening, a movable wall section for closing said opening, a foam mixer for supplying foam-forming material, a rotary flinger, means for moving said movable wall section to open said opening and for moving said rotary flinger through said opening into the space between said mold and a hollow member surrounding the mold, and for moving said rotary flinger back into the mold and for moving said movable wall section to close said opening, means within said mold enclosing said flinger to form a flushing chamber, means for supplying foam-forming material from said mixer to said flinger and means for rotating said flinger to fling said foam-forming material between said mold and said hollow member, and means for circulating a flushing fluid in said flushing chamber into contact with said flinger.

11. Apparatus for lining the interior of a hollow member including an inner mold adapted to be substantially surrounded by said hollow member, said mold being provided with an opening, a movable wall section for closing said opening, a foam mixer for supplying foam-forming material, a rotary flinger, means for moving said movable wall section to open said opening and for moving said rotary flinger through said opening into the space between said mold and a hollow member surrounding the mold, means for supplying foam-forming material from said mixer to said rotary flinger and means for rotating said flinger to fling said foam-forming material between said mold and said hollow member, means for emitting microwaves within said mold, said mold being formed of material pervious to microwaves.

References Cited by the Examiner
UNITED STATES PATENTS

| | | | |
|---|---|---|---|
| 1,626,447 | 4/1927 | Bramin | 264—309 XR |
| 1,684,858 | 9/1928 | Buente | 264—311 XR |
| 2,653,139 | 9/1953 | Sterling | 264—54 XR |
| 2,870,054 | 1/1959 | Amos et al. | 18—26 |
| 3,132,382 | 5/1964 | Magester | 264—54 XR |

WILLIAM J. STEPHENSON, *Primary Examiner.*